United States Patent
Nakai

(10) Patent No.: US 10,181,265 B2
(45) Date of Patent: Jan. 15, 2019

(54) IN-VEHICLE DISPLAY DEVICE, IN-VEHICLE DISPLAY DEVICE CONTROL METHOD, AND COMPUTER READABLE STORAGE MEDIUM

(71) Applicant: Panasonic Intellectual Property Management Co., Ltd., Osaka (JP)

(72) Inventor: Wataru Nakai, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 132 days.

(21) Appl. No.: 15/336,900

(22) Filed: Oct. 28, 2016

(65) Prior Publication Data

US 2017/0046959 A1    Feb. 16, 2017

Related U.S. Application Data

(63) Continuation of application No. PCT/JP2015/002445, filed on May 14, 2015.

(30) Foreign Application Priority Data

May 16, 2014  (JP) .................. 2014-101930

(51) Int. Cl.
*G08G 1/16* (2006.01)
*B60R 1/00* (2006.01)
(Continued)

(52) U.S. Cl.
CPC ............. *G08G 1/166* (2013.01); *B60K 35/00* (2013.01); *B60R 1/00* (2013.01); *G06K 9/00335* (2013.01);
(Continued)

(58) Field of Classification Search
CPC .. H04N 13/0246; B60W 40/04; B60W 30/08; B60W 50/0225; B60W 30/09; B60R 11/04
(Continued)

(56) References Cited

U.S. PATENT DOCUMENTS 5,214,504 A    5/1993  Toriu et al.
9,896,095 B2*  2/2018  Katoh ................... B60W 30/09
(Continued)

FOREIGN PATENT DOCUMENTS

| JP | 3-296876 | 12/1991 |
|----|----------|---------|
| JP | 2004-312523 | 11/2004 |
| JP | 2006-318062 | 11/2006 |

OTHER PUBLICATIONS

International Search Report of PCT application No. PCT/JP2015/002445 dated Jul. 21, 2015.

*Primary Examiner* — Tung T Vo
(74) *Attorney, Agent, or Firm* — Greenblum & Bernstein, P.L.C.

(57) ABSTRACT

An in-vehicle display device includes an image acquiring unit, a position predicting unit, and an image converting unit. The image acquiring unit acquires an image obtained by capturing an object existing around a host vehicle by a camera mounted on the host vehicle. The position predicting unit calculates a first positional relationship between the object and the host vehicle at timing T1 and calculates a second positional relationship between the host vehicle and the object at timing T2 after timing T1 based on the image acquired by the image acquiring unit and a capture timing. Furthermore, the position predicting unit predicts a third positional relationship between the host vehicle and the object at timing T3 after timing T2 based on the first positional relationship and the second positional relationship. The image converting unit converts the image acquired
(Continued)

by the image acquiring unit such that the positional relationship between the host vehicle and the object becomes the third positional relationship predicted by the position predicting unit.

7 Claims, 8 Drawing Sheets

(51) Int. Cl.
| | |
|---|---|
| H04N 7/18 | (2006.01) |
| B60K 35/00 | (2006.01) |
| G06K 9/00 | (2006.01) |
| G06K 9/66 | (2006.01) |
| G06T 1/00 | (2006.01) |
| G06T 7/00 | (2017.01) |
| G06T 7/215 | (2017.01) |

(52) U.S. Cl.
CPC ........... *G06K 9/00791* (2013.01); *G06K 9/66* (2013.01); *G06T 1/0007* (2013.01); *G06T 7/004* (2013.01); *G06T 7/215* (2017.01); *G08G 1/16* (2013.01); *H04N 7/18* (2013.01); *H04N 7/183* (2013.01); *B60K 2350/1076* (2013.01); *B60K 2350/1084* (2013.01); *B60K 2350/2013* (2013.01); *B60R 2300/30* (2013.01); *B60R 2300/80* (2013.01); *G06T 2207/30252* (2013.01); *G06T 2207/30261* (2013.01)

(58) Field of Classification Search
USPC .......................................................... 348/148
See application file for complete search history.

(56) References Cited

U.S. PATENT DOCUMENTS

| | | | |
|---|---|---|---|
| 2008/0084286 A1* | 4/2008 | Teramura ............... | B60Q 1/085 340/438 |
| 2008/0089557 A1 | 4/2008 | Iwaki et al. | |
| 2012/0330541 A1* | 12/2012 | Sakugawa ......... | B60W 30/0956 701/301 |
| 2014/0168377 A1* | 6/2014 | Cluff .................. | H04N 13/0246 348/47 |
| 2015/0116102 A1* | 4/2015 | Takahashi ............. | G08G 1/166 340/435 |
| 2015/0183431 A1* | 7/2015 | Nanami ................ | B60W 40/04 701/301 |
| 2015/0298621 A1* | 10/2015 | Katoh .................... | B60R 11/04 348/148 |
| 2016/0059855 A1* | 3/2016 | Rebhan ................ | B60W 30/08 701/41 |
| 2017/0001637 A1* | 1/2017 | Nguyen Van ..... | B60W 50/0225 |

* cited by examiner

IN-VEHICLE DISPLAY DEVICE, IN-VEHICLE DISPLAY DEVICE CONTROL METHOD, AND COMPUTER READABLE STORAGE MEDIUM

TECHNICAL FIELD

The present invention relates to an in-vehicle display device that processes an image captured by a camera mounted on a vehicle, and provides the processed image for a driver.

BACKGROUND ART

In recent years, there has been prevailed an in-vehicle display device that supports a driver by processing an image captured by a camera mounted on a vehicle and providing the processed image for the driver.

In such a situation, it is conceived that a predictive image producing technique for producing a predictive image based on an image captured in the past is applied to an in-vehicle display device.

As a conventional predictive image producing technique using a camera, a technique for producing a predictive image of an object has been known. In this technique, approximate moment features are extracted in the form of an ellipse from one and the same object on a first image at timing n−1 and a second image at timing n. Then, these moment features are associated with each other by affine transformation, and a predictive image of the object at any timing after timing n is produced (see, for example, PTL 1).

CITATION LIST

Patent Literature

PTL 1: Unexamined Japanese Patent Publication No. H03-296876

SUMMARY OF THE INVENTION

The present invention provides an in-vehicle display device capable of converting an image such that a camera mounted on a host vehicle is positioned with respect to an object existing around the host vehicle at a prediction timing, so as to produce a predictive image that reflects the relationship between the host vehicle and the object existing around the host vehicle in a three-dimensional space.

The in-vehicle display device according to the present invention includes an image acquiring unit, a position predicting unit, and an image converting unit. The image acquiring unit is adapted to acquire an image obtained by capturing an object existing around a host vehicle by a camera mounted on the host vehicle. The position predicting unit is adapted to calculate a first positional relationship between the object and the host vehicle at timing T1 and calculate a second positional relationship between the host vehicle and the object at timing T2 after timing T1 based on the image acquired by the image acquiring unit and a capture timing. Furthermore, the position predicting unit is adapted to predict a third positional relationship between the host vehicle and the object at timing T3 after timing T2 based on the first positional relationship and the second positional relationship. The image converting unit is adapted to convert the image acquired by the image acquiring unit such that the positional relationship between the host vehicle and the object becomes the third positional relationship predicted by the position predicting unit.

According to the present invention, the image converting unit can convert the image based on the positional relationship predicted by the position predicting unit so as to produce the predictive image that reflects the relationship between the host vehicle and the object existing around the host vehicle in a three-dimensional space.

DESCRIPTION OF EMBODIMENT

Prior to the description of an exemplary embodiment of the present invention, problems of the conventional in-vehicle display device will be briefly described. In the conventional predictive image producing technique using a camera, a method for converting an image for use in producing a predictive image is affine transformation. Therefore, a change of an object in a three-dimensional space is not considered. Thus, it is difficult to apply the conventional predictive image producing technique using a camera to an image captured by a camera mounted on a vehicle so as to produce a predictive image that reflects the relationship between a host vehicle and an object existing around the host vehicle in a three-dimensional space.

Figure 1:
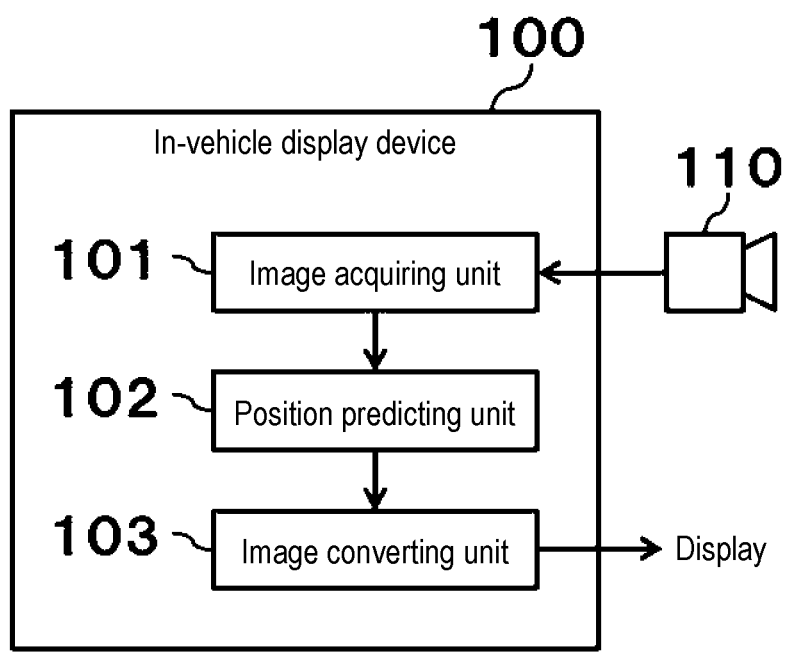
FIG. 1 is a block diagram illustrating the configuration of an in-vehicle display device in an exemplary embodiment of the present invention.

A description will be given of in-vehicle display device 100 in the exemplary embodiment of the present invention with reference to the attached drawings. FIG. 1 is a block diagram illustrating the configuration of in-vehicle display device 100.

In-vehicle display device 100 is connected to camera 110 that is mounted on a vehicle to capture the surroundings of the vehicle, for example, the rear side of the vehicle. Camera 110 inputs images captured in a predetermined frequency, for example, images of thirty frames captured for one second, into in-vehicle display device 100.

Image acquiring unit 101 is adapted to acquire an image, out of images captured by camera 110, for calculating the positional relationship in a three-dimensional space between a host vehicle and an object existing around the host vehicle at timing T1 and timing T2 after timing T1.

Position predicting unit 102 is adapted to calculate the positional relationship in the three-dimensional space between the host vehicle and the object existing around the host vehicle at timing T1 and timing T2 based on the image acquired by image acquiring unit 101 and its capture timing. The positional relationship at timing T1 is referred to as a first positional relationship, and the positional relationship at timing T2 is referred to as a second positional relationship. Position predicting unit 102 predicts a third positional relationship in the three-dimensional space between the host vehicle and the object existing around the host vehicle at timing T3 after timing T2 based on the first positional relationship and the second positional relationship.

Image converting unit 103 is adapted to convert the image acquired by image acquiring unit 101 according to the positional relationship predicted by position predicting unit 102, for example, an image captured at timing T2, and then, to display the converted image on, for example, a display disposed at a position of a rearview mirror inside of a vehicular cabin. Specifically, image converting unit 103 converts the image acquired by image acquiring unit 101 such that the positional relationship between the host vehicle and the object existing around the host vehicle becomes the third positional relationship predicted by position predicting unit 102 on the converted image to be output.

Figure 2:
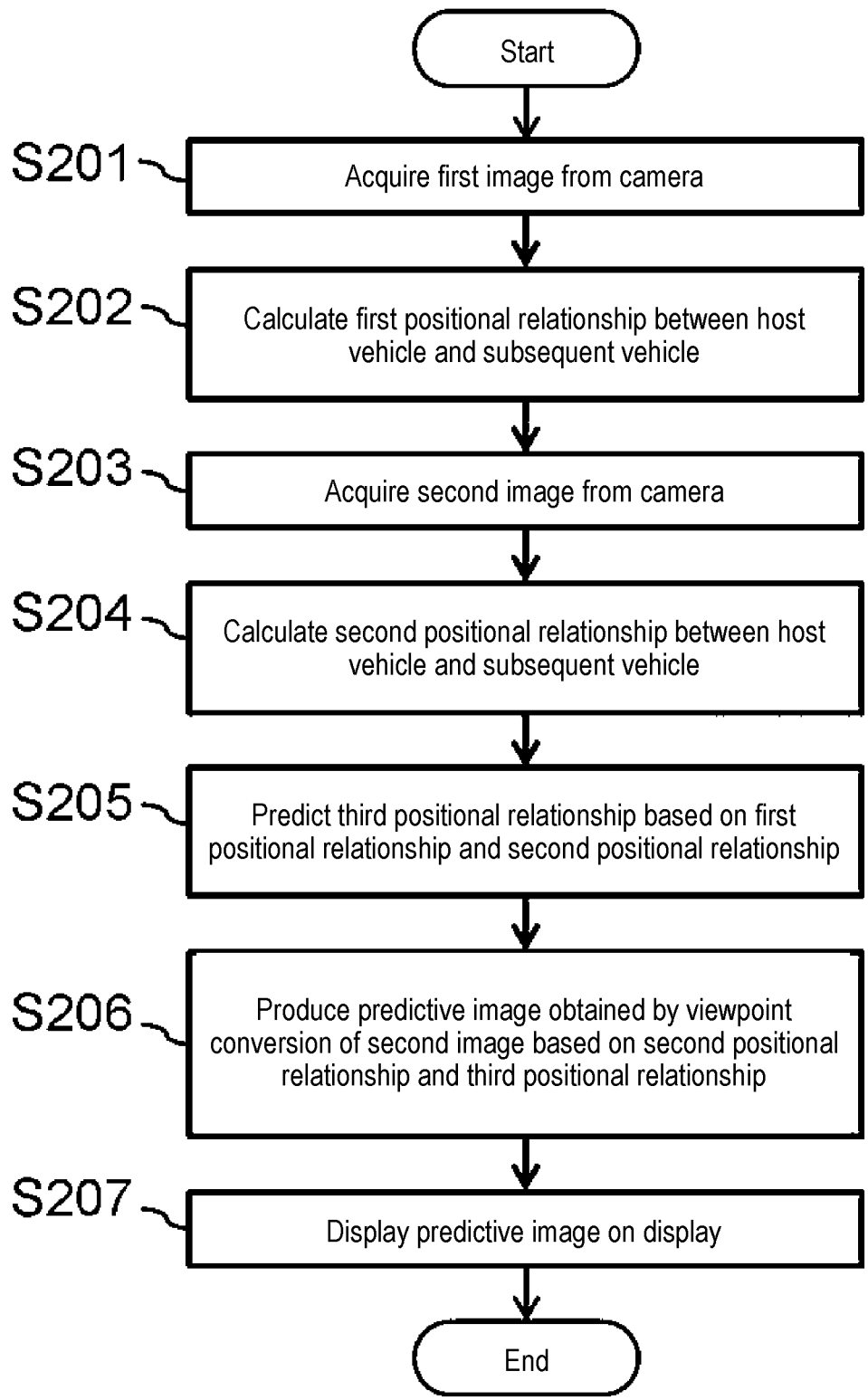
FIG. 2 is a flowchart illustrating one example of operation of the in-vehicle display device in the exemplary embodiment of the present invention.

The operation of in-vehicle display device 100 such configured as described above will be described. FIG. 2 is a flowchart illustrating one example of the operation of in-vehicle display device 100.

For the sake of simple explanation, the object existing around the host vehicle is assumed to be one of subsequent vehicles, for example. Image acquiring unit 101 acquires, from camera 110, an image for use in calculating the positional relationship between the host vehicle and the subsequent vehicle at timing T1 (step S201). Image acquiring unit 101 acquires an image captured at a timing before capture timing T1 and a first image captured at capture timing T1.

Position predicting unit 102 specifies the subsequent vehicle using an optical flow based on the image at the timing before capture timing T1, acquired by image acquiring unit 101, and the first image captured at capture timing T1, and thus, calculates a first positional relationship between the host vehicle and the subsequent vehicle at timing T1 (step S202). Processing for specifying the subsequent vehicle and processing for calculating the position of the subsequent vehicle will be described later in detail with reference to the attached drawings.

Image acquiring unit 101 acquires, from camera 110, an image for calculating the positional relationship between the host vehicle and the subsequent vehicle at timing T2 after timing T1 (step S203). Image acquiring unit 101 acquires an image captured at a timing before capture timing T2 and a second image captured at capture timing T2.

Position predicting unit 102 specifies the subsequent vehicle using an optical flow based on the image at the timing before capture timing T2, acquired by image acquiring unit 101, and the second image captured at capture timing T2, and thus calculates a second positional relationship between the host vehicle and the subsequent vehicle at timing T2 (step S204).

Position predicting unit 102 predicts a third positional relationship between the host vehicle and the subsequent vehicle at timing T3 after a lapse of a predetermined period of time after timing T2 based on the first positional relationship between the host vehicle and the subsequent vehicle at timing T1, which is calculated in step S202, and the second positional relationship between the host vehicle and the subsequent vehicle at timing T2, which is calculated in step S204 (step S205). Processing for predicting the third positional relationship will be described later with reference to the attached drawings.

Image converting unit 103 produces a predictive image by converting a viewpoint of the second image at timing T2 based on the second positional relationship between the host vehicle and the subsequent vehicle at timing T2, which is calculated in step S204, and the third positional relationship between the host vehicle and the subsequent vehicle at timing T3, which is predicted in step S205 (step S206). The viewpoint conversion will be described later with reference to the attached drawings.

Image converting unit 103 outputs the predictive image onto, for example, a display disposed at the fixture position of the rearview mirror inside of the vehicular cabin at, for example, timing T3. This predictive image is displayed on the display (step S207).

In this manner, in-vehicle display device 100 is controlled by the following method. First, the first positional relationship between the host vehicle and the object existing around the host vehicle at timing T1 is calculated. Next, the second positional relationship between the host vehicle and the object at timing T2 after timing T1 is calculated. Then, the third positional relationship between the host vehicle and the object at timing T3 after timing T2 is predicted based on the first positional relationship and the second positional relationship. Based on the predicted third positional relationship, the image captured at timing T1 or timing T2 is converted, and thus the predictive image at timing T3 is produced.

FIG. 3A to FIG. 5B are views for describing the processing for specifying the subsequent vehicle and the processing for calculating the position of the subsequent vehicle in step S202 and step S204 of FIG. 2.

The first image and the second image are subjected to the same processing in step S202 and step S204, respectively. The processing for specifying the subsequent vehicle and the processing for calculating the position of the subsequent vehicle in step S202 will be described below with reference to FIG. 3A to FIG. 5B. It is noted that external parameters of the camera is calculated in advance so that the distance between the object on a road and the camera is calculated.

Figure 3A:
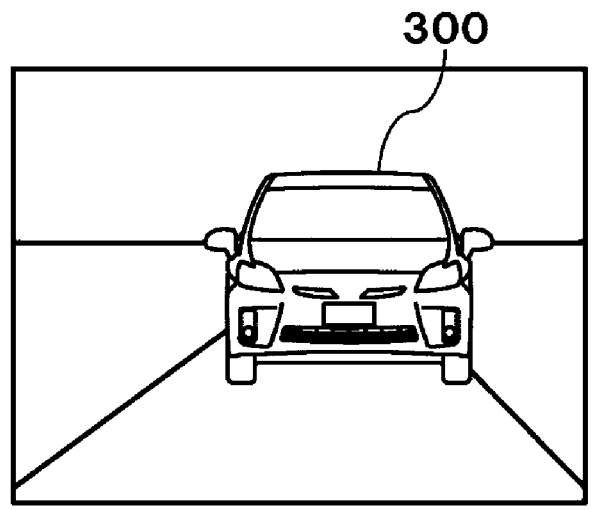
FIG. 3A is a view showing an image captured at capture timing T1 from a camera by the image acquiring unit shown in the FIG. 1.

FIG. 3A is a view showing the first image at capture timing T1 acquired from camera 110 by image acquiring unit 101. Subsequent vehicle 300 at timing T1 is displayed on the first image.

Figure 3B:
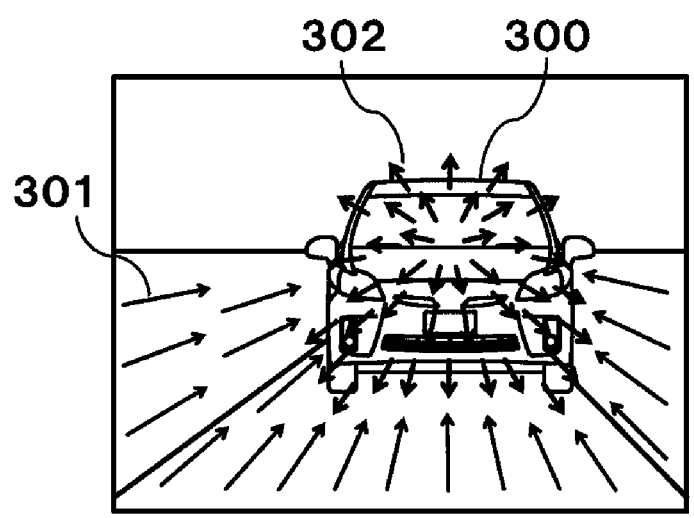
FIG. 3B is a first view illustrating a subsequent vehicle specifying processing and a position calculating processing in the exemplary embodiment of the present invention.

FIG. 3B illustrates processing for detecting subsequent vehicle 300 according to the optical flow by using the first image and the image captured at the timing before capture timing T1 by position predicting unit 102. The technique for detecting an object according to the optical flow has been known, and therefore, its detailed explanation is omitted here. A region specified by a plurality of vectors 302 reverse to a plurality of vectors 301 indicating a background is detected as the subsequent vehicle.

Figure 4A:
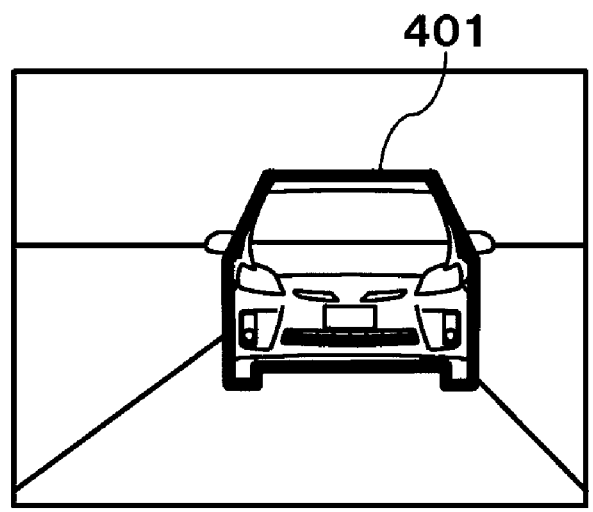
FIG. 4A is a view showing a region of a subsequent vehicle detected based on the image shown in FIG. 3A.
Figure 4B:
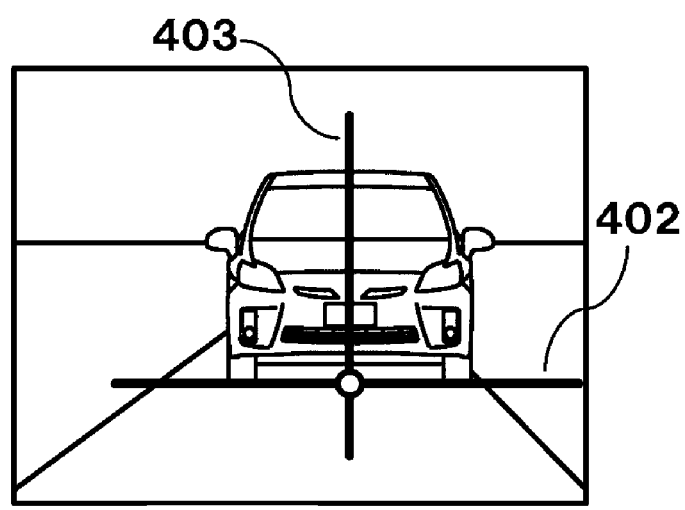
FIG. 4B is a second view illustrating the subsequent vehicle specifying processing and the position calculating processing in the exemplary embodiment of the present invention.

FIG. 4A is a view showing region 401 indicating the subsequent vehicle detected based on the first image. Position predicting unit 102 calculates the lateral center and the lower end of region 401 indicating the detected subsequent vehicle. In FIG. 4B, the lower end of region 401 indicating the subsequent vehicle is calculated as straight line 402, whereas the lateral center is calculated as straight line 403 that bisects region 401 indicating the subsequent vehicle in a lateral direction.

Position predicting unit 102 calculates relative position Zn in a front-to-rear direction between the host vehicle and the subsequent vehicle on the assumption that the lower end of calculated region 401 indicating the subsequent vehicle is on a road. Moreover, position predicting unit 102 calculates relative position Xn in a lateral direction between the host vehicle and the subsequent vehicle based on a deviation of the lateral center from the center of the image.

Figure 5A:
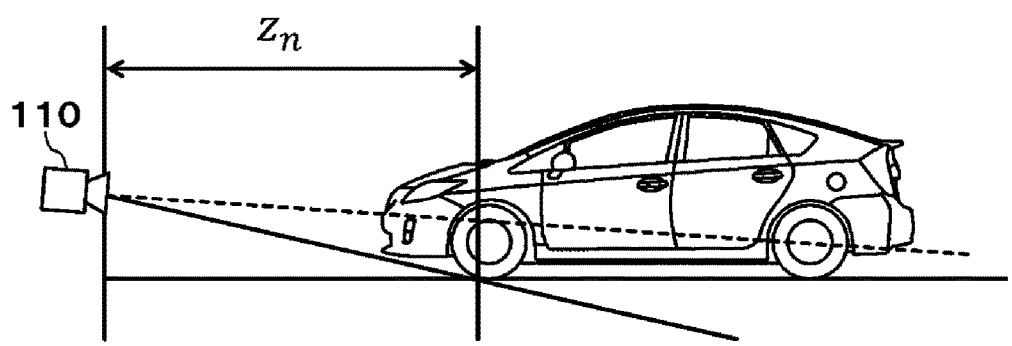
FIG. 5A is a view showing relative position Zn of the subsequent vehicle with respect to a host vehicle in the exemplary embodiment of the present invention.
Figure 5B:
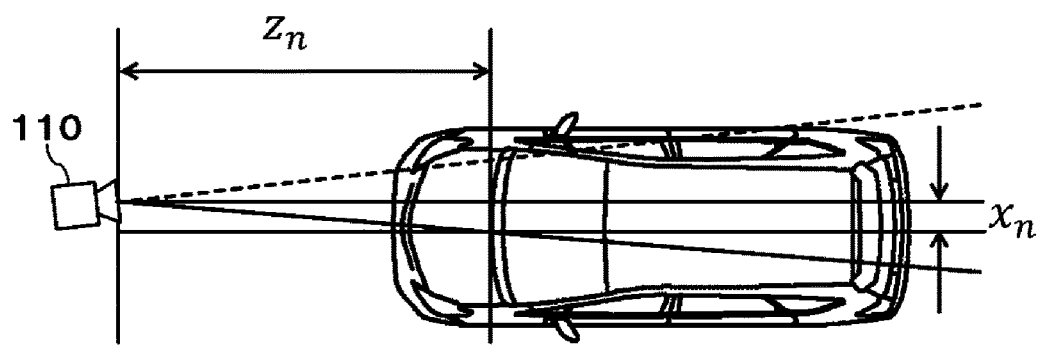
FIG. 5B is a view showing relative positions Zn and Xn of the subsequent vehicle with respect to the host vehicle in the exemplary embodiment of the present invention.

FIG. 5A is a view showing relative position Zn, whereas FIG. 5B a view showing relative positions Zn and Xn.

Position predicting unit 102 subjects the second image captured at capture timing T2 to a similar processing, and calculates relative position P1 (X1, Y1, Z1) as the first position of the subsequent vehicle with respect to the host vehicle at timing T1 and relative position P2 (X2, Y2, Z2) as the second position of the subsequent vehicle with respect to the host vehicle at timing T2.

Here, a relative position in a vertical (height) direction between the host vehicle and the subsequent vehicle is denoted by Yn. In this exemplary embodiment, assuming that the vehicle travels on a plane, and therefore, a description will be given on the assumption that Yn is 0.

Figure 6A:
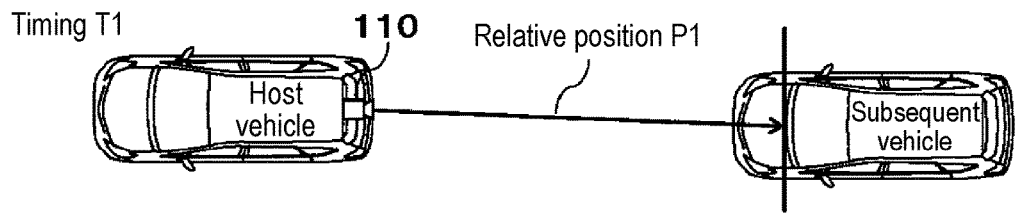
FIG. 6A is a view showing relative position P1 of the subsequent vehicle with respect to the host vehicle at timing T1 in the exemplary embodiment of the present invention.
Figure 6B:
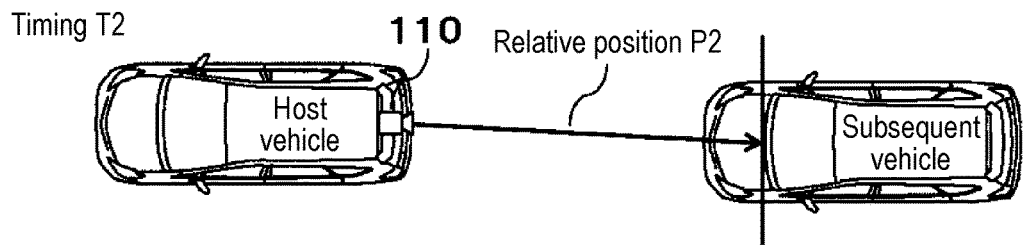
FIG. 6B is a view showing relative position P2 of the subsequent vehicle with respect to the host vehicle at timing T2 in the exemplary embodiment of the present invention.
Figure 6C:
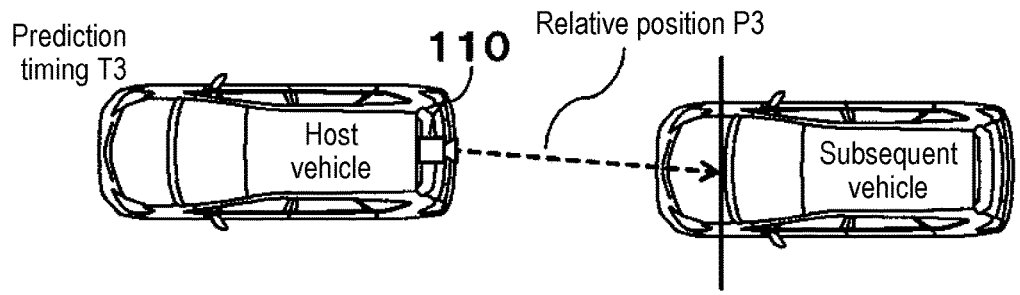
FIG. 6C is a view illustrating predicting processing of the position of the subsequent vehicle at prediction timing T3 in the exemplary embodiment of the present invention.

FIG. 6A to FIG. 6C are views illustrating the processing for predicting the third position in step S205 of FIG. 2. Position predicting unit 102 predicts relative position P3 between the host vehicle and the subsequent vehicle at timing T3 after a lapse of a predetermined period of time after timing T2 shown in FIG. 6C based on relative position P1 between the host vehicle and the subsequent vehicle at timing T1 shown in FIG. 6A and relative position P2 between the host vehicle and the subsequent vehicle at timing T2 shown in FIG. 6B.

Position predicting unit 102 predicts P3 based on a relative speed between the host vehicle and the subsequent vehicle and the relative position between the host vehicle and the subsequent vehicle. Position predicting unit 102 calculates relative speed V (V1, V2, V3) between the host vehicle and the subsequent vehicle according to V=(P2−P1)/(T2−T1) based on relative position P1 between the host vehicle and the subsequent vehicle at timing T1 and relative position P2 between the host vehicle and the subsequent vehicle at timing T2.

Position predicting unit 102 calculates relative position P3 (X3, Y3, Z3) between the host vehicle and the subsequent vehicle at prediction timing T3 according to P3=P2+V×(T3−T2) based on calculated relative speed V and relative position P2 between the host vehicle and the subsequent vehicle at timing T2.

FIG. 6C illustrates that relative distance Z3 between the host vehicle and the subsequent vehicle at prediction timing T3 becomes shorter than that at timing T2 so that the relative position shifts leftward in an advance direction (i.e., X3 becomes larger).

Figure 7:
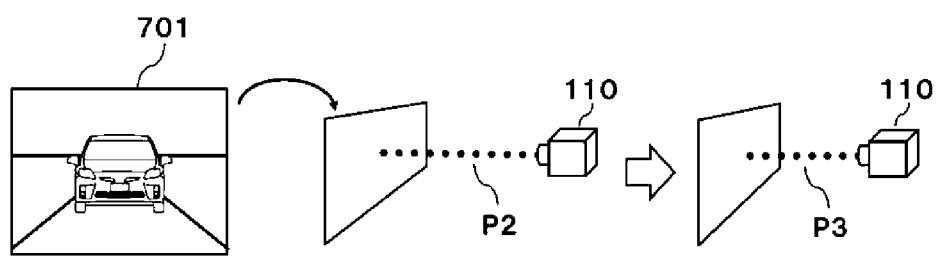
FIG. 7 is a conceptual diagram illustrating viewpoint conversion in producing a predictive image in the exemplary embodiment of the present invention.

FIG. 7 is a conceptual diagram illustrating the viewpoint conversion of an image, for producing a predictive image at image converting unit 103 in step S206 of FIG. 2.

The viewpoint conversion of an image signifies converting an image captured at a certain camera position into an image captured at a different camera position. Image 701 in FIG. 7 indicates the second image captured by camera 110 at timing T2. The position of camera 110 at timing T2 is represented by relative position P2 between the host vehicle and the subsequent vehicle.

Image converting unit 103 converts the second image captured at camera position P2 into an image captured at relative position P3 between the host vehicle and the subsequent vehicle at timing T3, which is predicted by position predicting unit 102.

Image converting unit 103 converts an image in such a manner as to achieve relative position P3 between an object and the camera on the assumption that the entire object on the second image is located at relative position P2 with respect to the camera.

Figure 8A:
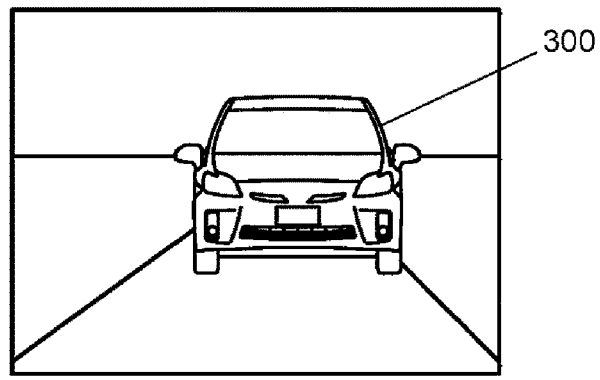
FIG. 8A is a view showing one example of a camera image at timing T1 in the exemplary embodiment of the present invention.
Figure 8B:
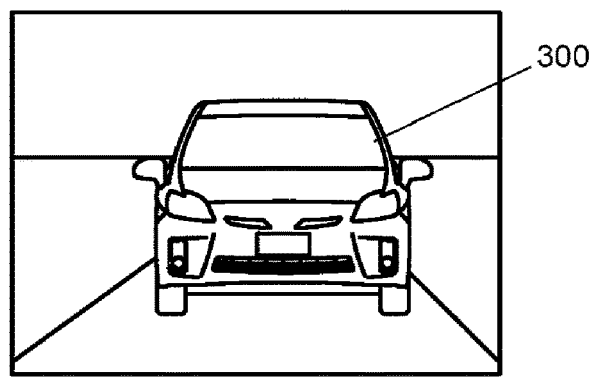
FIG. 8B is a view showing one example of a camera image at timing T2 in the exemplary embodiment of the present invention.
Figure 8C:
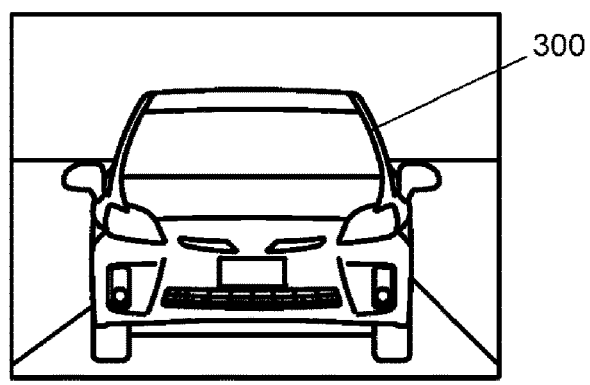
FIG. 8C is a view showing one example of a predictive image at prediction timing T3 in the exemplary embodiment of the present invention.

FIG. 8A to FIG. 8C are views showing a camera image and a predictive image in the exemplary embodiment. FIG. 8A shows the first image at timing T1; FIG. 8B shows the second image at timing T2; and FIG. 8C shows the predictive image at prediction timing T3.

In in-vehicle display device 100, position predicting unit 102 predicts the relative position between the host vehicle and subsequent vehicle 300 at the prediction timing, that is, the relationship between the host vehicle and subsequent vehicle 300 in a three-dimensional space, and then, produces the predictive image based on the predicted relative position. The relationship between the host vehicle and subsequent vehicle 300 in a three-dimensional space is reflected on the predictive image. The predictive image is shown in FIG. 8C and produced in in-vehicle display device 100 in the exemplary embodiment.

As described above, in-vehicle display device 100 includes image acquiring unit 101, position predicting unit 102, and image converting unit 103. Image acquiring unit 101 acquires the image obtained by capturing the object existing around the host vehicle by camera 110 mounted on the host vehicle. Position predicting unit 102 predicts the positional relationship between the host vehicle and the object existing around the host vehicle after a lapse of a predetermined period of time after the capture timing of the image acquired by image acquiring unit 101. Image converting unit 103 converts the image acquired by image acquiring unit 101 according to the positional relationship predicted by position predicting unit 102. Then, image converting unit 103 converts the image in such a manner that the positional relationship between the host vehicle and the object existing around the host vehicle becomes the positional relationship predicted by position predicting unit 102. In this manner, it is possible to produce the predictive image that reflects the relationship between the host vehicle and the object existing around the host vehicle in a three-dimensional space.

In the above-described description, image converting unit 103 converts the image on the assumption that the entire object on the image is located at relative position P2 with respect to the camera. However, in the case where the three-dimensional position of the object displayed on the image is found, position predicting unit 102 may predict respective prediction positions P3, and furthermore, image converting unit 103 may convert an image in such a manner that the respective distances are changed by P2-P3. With this configuration, it is possible to produce a predictive image that more reflects the relationship of a thing in a three-dimensional space, so as to make it easier for a driver to grasp the distance between a driver's vehicle and a subsequent vehicle.

Moreover, in the above-described description, position predicting unit 102 calculates the relative speed between the host vehicle and the subsequent vehicle based on the relative positions between the host vehicle and the subsequent vehicle at timing T1 and timing T2, and then, predicts the positional relationship between the host vehicle and the subsequent vehicle based on the relative speed. However, position predicting unit 102 may calculate the relative position between the host vehicle and the subsequent vehicle at numerous timings, obtain a relative acceleration that signifies a change in relative speed, and thus, predict the positional relationship between the host vehicle and the subsequent vehicle after a lapse of a predetermined period of time based on the relative speed, the relative acceleration, and the position of the subsequent vehicle. In this manner, it is possible to enhance the prediction accuracy of the positional relationship between the host vehicle and the subsequent vehicle, so as to produce a predictive image that reflects the more accurate relationship between the host vehicle and the subsequent vehicle in a three-dimensional space.

In this case, position predicting unit 102 calculates a fourth positional relationship between the host vehicle and the subsequent vehicle at timing T0 before timing T1 based on the image acquired by image acquiring unit 101 and its capture timing. Thereafter, position predicting unit 102 obtains a relative acceleration between the host vehicle and the subsequent vehicle based on the first relative speed between the host vehicle and the subsequent vehicle and the second relative speed between the host vehicle and the subsequent vehicle. The first relative speed is obtained based on the fourth positional relationship and the first positional relationship, and the second relative speed is obtained based on the first positional relationship and the second positional relationship. After that, position predicting unit 102 predicts the third positional relationship based on the relative acceleration, the relative speed between the host vehicle and the subsequent vehicle, which is obtained based on the first positional relationship and the second positional relationship, and the second positional relationship.

Furthermore, in the above-described description, the relative position, relative speed, and relative acceleration between the host vehicle and the subsequent vehicle are calculated by using the camera. However, the relative position, relative speed, and relative acceleration may be calculated by using a device other than the camera, such as a laser radar, an extremely high frequency radar, or a sonar.

The in-vehicle display device in the exemplary embodiment of the present invention is implemented by dedicated hardware. Besides, the in-vehicle display device may be implemented by recording a program for performing the functions onto a computer readable storage medium, and causing a computer system to read and execute the program recorded onto the storage medium.

INDUSTRIAL APPLICABILITY

The in-vehicle display device, the in-vehicle display device control method, and the program of the present invention are applicable to a vehicular electronic mirror and the like.

REFERENCE MARKS IN THE DRAWINGS

100 in-vehicle display device
101 image acquiring unit
102 position predicting unit
103 image converting unit
110 camera
300 subsequent vehicle
301, 302 vector
401 region
402, 403 straight line
701 image

The invention claimed is:
1. An in-vehicle display device comprising:
an image acquirer configured to acquire an image obtained by capturing a following vehicle following a host vehicle by a camera mounted on the host vehicle;
a position predictor configured to calculate a first positional relationship between the host vehicle and the following vehicle at timing T1, based on a first image acquired by the image acquirer, and further configured to calculate a second positional relationship between the host vehicle and the following vehicle at timing T2 after the timing T1, based on a second image acquired by the image acquirer, and additionally configured to predict a third positional relationship between the host vehicle and the following vehicle at timing T3 after the timing T2, based on the first positional relationship and the second positional relationship; and
an image converter configured to convert the second image to a third image based on the third positional relationship so as to produce a predictive image at the timing T3, and further configured to output the third image to a display.
2. The in-vehicle display device according to claim 1, wherein the position predictor predicts the third positional relationship, based on a relative speed between the host vehicle and the following vehicle and the second positional relationship, the relative speed being obtained based on the first positional relationship and the second positional relationship.
3. The in-vehicle display device according to claim 1, wherein the position predictor calculates a fourth positional relationship between the host vehicle and the following vehicle at timing T0 before the timing T1, based on a fourth image acquired by the image acquirer, and predicts the third positional relationship based on:
a relative acceleration obtained based on a first relative speed between the host vehicle and the following vehicle, obtained based on the fourth positional relationship and the first positional relationship, and a second relative speed between the host vehicle and the following vehicle, obtained based on the first positional relationship and the second positional relationship;
a relative speed between the host vehicle and the following vehicle, obtained based on the first positional relationship and the second positional relationship; and
the second positional relationship.

4. A method for controlling an in-vehicle display device for processing an image captured by a camera mounted on a host vehicle so as to display the image on a display, the method comprising:

calculating a first positional relationship at timing T1 between the host vehicle and a following vehicle following the host vehicle, based on a first image captured by the camera;

calculating a second positional relationship between the host vehicle and the following vehicle at timing T2 after the timing T1, based on a second image captured by the camera;

predicting a third positional relationship between the host vehicle and the following vehicle at timing T3 after the timing T2 based on the first positional relationship and the second positional relationship;

converting the second image to a third image based on the third positional relationship so as to produce a predictive image at the timing T3; and outputting the third image to the display.

5. A non-transitory computer readable storage medium on which is stored a program for causing a computer in connection with an in-vehicle display device for processing an image captured by a camera mounted on a host vehicle so as to display the image on a display, to execute:

calculating a first positional relationship at timing T1 between the host vehicle and a following vehicle following the host vehicle, based on a first image captured by the camera;

calculating a second positional relationship between the host vehicle and the following vehicle at timing T2 after the timing T1, based on a second image captured by the camera;

predicting a third positional relationship between the host vehicle and the following vehicle at timing T3 after the timing T2 based on the first positional relationship and the second positional relationship;

converting the second image to a third image based on the third positional relationship so as to produce a predictive image at the timing T3; and outputting the third image to the display.

6. The in-vehicle display device according to claim 1, wherein the display is a rear-view display.

7. The method according to claim 4, wherein the display is a rear-view display.

* * * * *